United States Patent [19]

Johnson et al.

[11] Patent Number: 4,627,625
[45] Date of Patent: Dec. 9, 1986

[54] AIR SEAL BETWEEN RELATIVELY MOVEABLE DUCTS

[75] Inventors: Samuel C. Johnson; James C. Elliott, both of Spartanburg, S.C.

[73] Assignee: Dresser Industries, Inc., Dallas, Tex.

[21] Appl. No.: 250,322

[22] Filed: Apr. 2, 1981

[51] Int. Cl.⁴ .................... F16J 15/08; F16J 15/52
[52] U.S. Cl. ........................... 277/27; 277/97; 277/236
[58] Field of Search .................. 277/27, 88, 3, 97, 236

[56] References Cited

U.S. PATENT DOCUMENTS

| | | | |
|---|---|---|---|
| 1,033,681 | 7/1912 | Drager | 277/97 |
| 3,034,796 | 5/1962 | Wilk | 277/27 |
| 3,445,119 | 5/1969 | Andresen et al. | 277/27 |
| 3,767,212 | 10/1973 | Ludwig | 277/27 |
| 4,291,887 | 9/1981 | Frosch | 277/27 |
| 4,383,693 | 5/1983 | Heller | 277/236 X |

FOREIGN PATENT DOCUMENTS 298665 10/1928 United Kingdom ................ 277/236

Primary Examiner—Robert S. Ward
Attorney, Agent, or Firm—Fred A. Winans

[57] ABSTRACT

A seal for interconnecting a vibrating plenum chamber to a stationary air duct for air flow communication therebetween. The chamber defines an inlet duct bounded by an upstream facing annular sealing surface. A baffle member is attached to, and encircles, the adjacent end of the stationary air duct. The baffle member comprises a pair of outwardly converging annular sides sealingly joined at their outer radius, with the innermost annular portion of one side attached to the stationary air duct and the innermost annular portion of the other side attached to a sealing member defining an annular surface slidingly engaging the upstream facing annular sealing surface on the inlet duct.

4 Claims, 3 Drawing Figures

AIR SEAL BETWEEN RELATIVELY MOVEABLE DUCTS

BACKGROUND OF THE INVENTION

1. Field of the Invention

This invention relates to an air seal and, more particularly, to such a seal for interconnecting a vibrating plenum chamber with a stationary air duct.

2. Description of the Prior Art

It is well known to provide an air drying system to dry particulate materials, such as coal or other crushed or particulate matter, as the material is being conveyed on a vibrating conveyor. To accomplish this, drying air is introduced into the lower plenum chamber of a vibrating conveyor mechanism through inlet air ducts in the side thereof. The air passes upwardly through the vibrating screen panels which comprise the conveying surface and then through the material being conveyed thereon. The passage of air combines with the screen vibration to produce movement of the material along the screen and finally out of the dryer mechanism.

The drying air is delivered to the plenum chamber from a stationary air-conditioning and delivery unit such as an air heater or cooler having a blower fan for circulating the air. This air is transported through a main delivery duct to exit through a plurality of stationary air ducts in communication with the inlet air ducts. Thus, it is seen that some mechanism is necessary to establish a sealed connection for air delivery from the stationary duct to the vibrating chamber.

Heretofore, it has been common practice to provide a flexible interconnecting sleeve, such as a plastic or rubber-coated woven fabric or the like, providing a flexible material with the synthetic coating forming a sealed flexible passage. This sleeve was clamped to the adjacent respective ducts. However, such a flexible interconnector becomes rapidly fatigued, especially if wrinkled or crimped in any manner, resulting in leakage openings developing which in turn results in air loss to the extent the sleeves must be regularly replaced.

The failure rate of the flexible sleeves is aggravated when the drying air is heated to an elevated temperature, which is the most common and efficient drying air. In such instance, the drying capacity of the conveyor is a direct function of the differential in temperatures between the drying air and the ambient air and also the area of the drying screen. As the cost of the conveyor is largely dependent on its size, it is evident that the drying capacity can be increased for a given area by increasing the drying air temperature. However, the operating temperature is determined by the temperature limiting characteristics of the flexible material. Thus, it is common to operate at an air temperature differential of approximately 300°–400° F. although temperature differentials of 600°–700° F. are readily available in the air heater apparatus without much increase in cost. Thus, it is evident that if the interconnecting air seal between the conveyor and the air supply could withstand higher temperatures for longer periods of time, a more efficient and greater capacity drying conveyor could be provided.

SUMMARY OF THE PRESENT INVENTION

The present invention provides a seal, connecting the stationary air ducts and the inlet ducts of the vibrating plenum chamber, which is all metal and therefore generally not limited to a low temperature operating range and which is essentially free-floating in that it is biased into a sealing engagement, as opposed to being clamped so that fatigue stresses are minimized. The seal of the present invention includes a first sealing surface surrounding the inlet duct to the vibrating chamber and facing generally in the direction of the air flow. A diaphragm-type structure is attached to and surrounds the hot air outlet duct of the air-conditioning system. The diaphragm structure generally defines a truncated conical member formed by outwardly converging annular side members sealingly joined at their juncture. In the preferred embodiment, one of the annular side members is a truncated conical member and the other is a planar member to provide the desired degree of axial flexibility to effect an air seal.

The innermost portion of the upstream side member of the diaphragm is attached to the outlet air duct whereas the innermost portion of the downstream side member is attached to a second annular sealing member defining a sealing surface in facing, sliding engagement sealingly abutting the first sealing surface on the inlet duct. The planar side member permits the configuration to readily act like a diaphragm or bellows by flexing axially such that the pressurized air in the air-conditioning system produces a static pressure biasing the planar side, in this instance the downstream leg, axially to force the second sealing surface into sealing abutting engagement with the first sealing surface.

The first sealing surface defines an annular radial dimension sufficient to accommodate the magnitude of the vibrating motion of the chamber without loss of contact between the two engaging surfaces, which would result in an unsealed condition therebetween. Also, the flexible nature of the diaphragm construction permits slight axial angular misalignment (i.e. the first sealing face is not required to be exactly parallel to the second sealing face, but can be resiliently forced into parallelism upon abutting engagement therebetween.)

Also, in that all components are made of metal, and the relative movement between the two air ducts does not flex the metal (resulting only in a floating or sliding engagement at the sealing interface) the seal is not sensitive to, nor limited by, the temperatures, at least within the normal operating temperature range of the air-conditioning unit and thus a long-life seal is provided.

Further, it is apparent that a seal of the instant invention which provides air sealing engagement merely by a biased abutment, could be useful for sealingly interconnecting air ducts where such interconnection is generally inaccessible for final clamped interface.

DESCRIPTION OF THE PREFERRED EMBODIMENT

Figure 1:
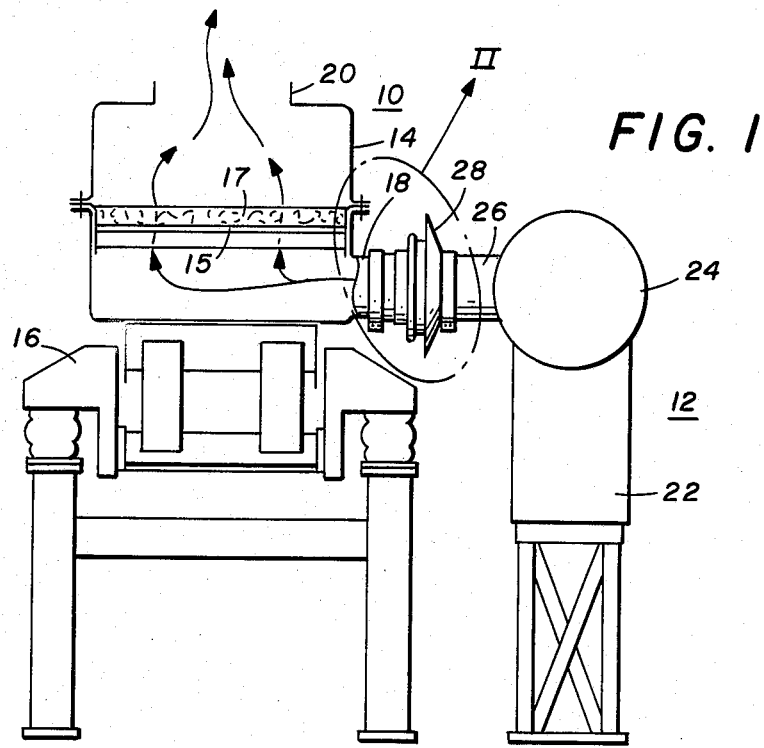
FIG. 1 is a schematic of an elevational crosssectional view of a conveyor dryer mechanism and an air-conditioning unit providing hot air to the conveyor.

Referring to FIG. 1, a vibrating bed drying conveyor 10 is schematically shown coupled in air-flow communication to an air heater and blower unit 12. The conveyor 10 comprises a plenum chamber 14 enclosing a generally horizontal screen 15 and mounted for vertically oriented vibration on a base 16. The chamber 14 has a material inlet and outlet (not shown) and drying air inlets 18 and exhausts 20. It is seen that the air inlet 18 is in the side of the chamber 14 below the screen 15 and the exhaust is above the screen.

Also schematically shown is the air-conditioning unit 12 stationarily mounted adjacent the conveyor which comprises a chamber 20 housing an air heating means such as a burner or an air cooling means such as cooling coils and a blower (not shown) for delivering conditioned air having a relatively low humidity content to a header 24. Outlet ducts 26 extend from the header 24 to the inlet duct 18 of the vibrating plenum chamber and are coupled thereto by the air seal 28 of the present invention.

It is to be understood that both the header 24 and the chamber 18 extend over a predetermined length to provide sufficient residency time of the material within the chamber for the material to become dry. Thus, it is not uncommon to have on the order of from 8 to 20 such air inlet/air outlet sealed connections 28 in a single system.

As previously stated, the prior art air seal interconnection for the most part comprised a rubber or synthetic coated woven material providing a flexible sleeve to accommodate the relative motion between the chamber and the air delivery unit and yet provide a sealed air path therebetween. However, such fabric tended to be rapidly worn to the extent of developing air leaks. Such leaks generally initially developed at the corners of wrinkles or creases produced in the sleeve when clamped to the opposed ducts, due to the continuous vibration of the sleeve. This deterioration was greatly accelerated if the drying process used heated air (i.e. on the order of 200°-300° F.). Under such conditions, a leak of hot air could also cause other items of the apparatus to deteriorate and require replacement particularly if the leaking air impinged on certain parts of the support structure of the conveyor. Further, as previously mentioned, such sleeves could not withstand temperatures much above the 300° F. temperature range without further rapid deterioration and were totally unacceptable for use in temperature ranges of 500°-600° F.

Figure 2:
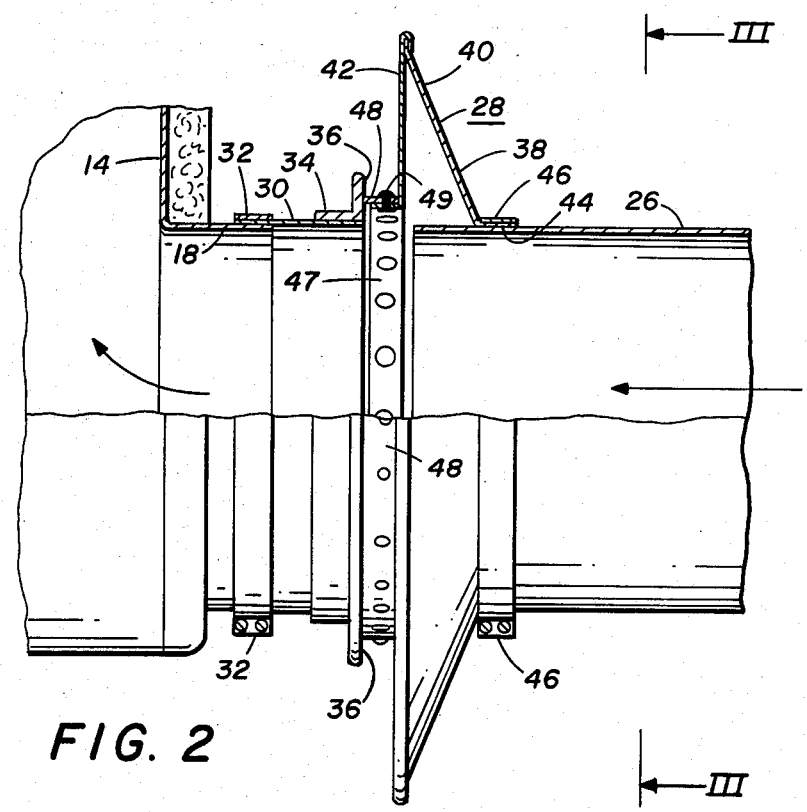
FIG. 2 is an enlarged view of the air seal of FIG. 1 with portions broken away.
Figure 3:
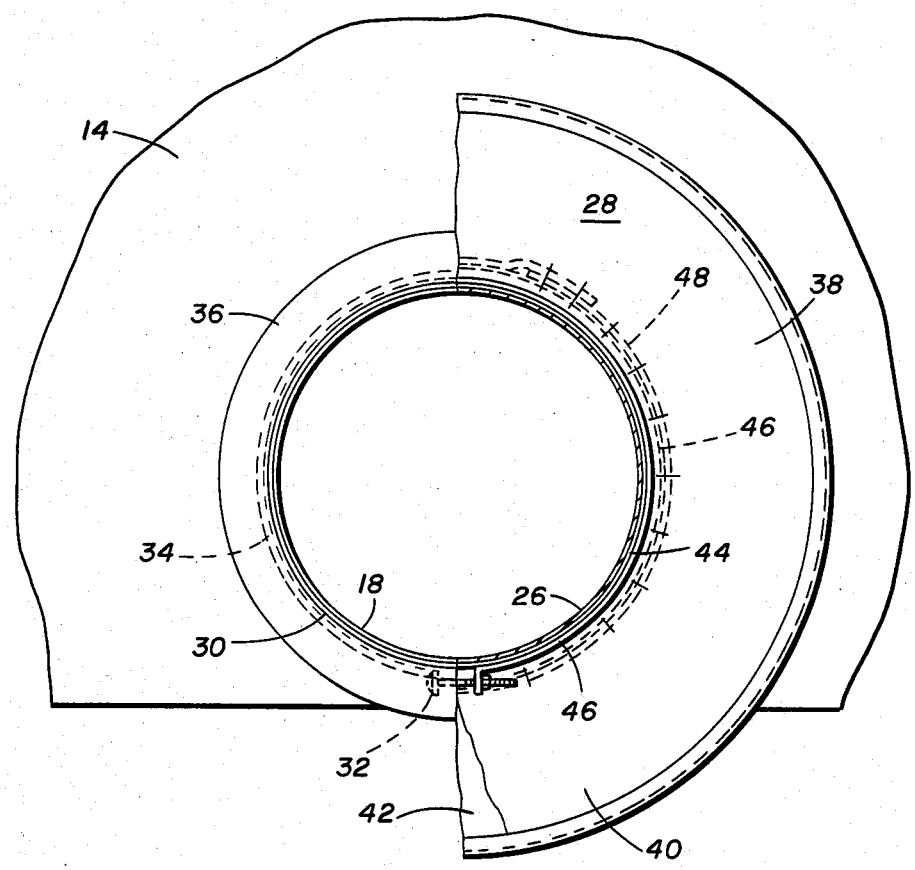
FIG. 3 is a view along line III—III of FIG. 2 with upstream portions broken away generally along a vertical centerline.

With reference now to FIGS. 2 and 3, the air seal of the present invention is shown interconnecting the vibrating plenum chamber 14 with the air delivery system 12. As therein seen, the plenum chamber 14 has an outwardly extending air inlet duct 18. An extension member 30 is clamped thereto as by a strap clamp 32. A collar member 34 is attached to the terminal end of the extension 30 as by brazing or welding and, as seen, comprises an "L" shaped annular flange defining a downstream facing annular sealing surface 36 (i.e. facing in the direction of air flow as shown by the arrow). The collar member 34 is preferably made of stainless steel whereas the extension member 30 is made of any acceptable metal such as a galvanized steel.

The facing adjacent downstream end of the hot air duct 26 supports a diaphragm mechanism 38. The diaphragm structure includes a pair of radially outwardly axially converging annular side members 40 and 42 encircling the outlet duct 26 and integrally joined at their outer juncture as by being crimped together in an air-tight sealed engagement. The opposed side members 40 and 42 form a generally truncated conical bellows-like mechanism. The upstream leg 40 terminates radially inwardly in an axially upstream extending annular lip portion 44 around which a strap clamp 46 is attached to clamp the diaphragm member 38 to the annular duct 26. The downstream leg 40 terminates radially inward in an axially downstream annular extension 47 which has attached thereto, as by rivets 49, a sealing ring 48 which extends axially beyond the extension 47 into a sliding sealing engagement with face 36 of the flange 34. The diaphragm structure 38 is preferably formed of thin metal stock, such as galvanized steel, and the sealing ring 48 is preferably formed of a relatively soft metal such as aluminum, to provide a minimum frictional engagement with the stainless steel face 36 on the flange 34.

It will further be noted that the configuration of the diaphragm structure 38 provides a generally conical leg 40 and a generally flat or planar leg 42. The flat leg 42 is generally axially flexible with respect to leg 40. Thus, the internal static air pressure within the area between the two opposing legs generally biases them axially away from one another causing the sealing ring 48 to be biased into an annular sealed engaging relationship with the surface 36. It is however evident that the planar leg 42 could be attached to the duct 26 and the conical leg 40 be attached to the sealing ring 48 and the same results would occur.

Further, it is noted that the sealing ring 48 is attached to the extension 47 as by rivets; however, any means of attachment could be utilized. Further, it is apparent that the flange 34 could be made of a relatively soft metal and the sealing ring 48 made of a harder metal to provide the dissimilar metals to minimize friction, however, under such configuration, the vibratory movement between the two could cause a groove to form in the soft metal flange 36 which may, after a period of time, limit the relative movement of the sealing ring to within such groove and thereby eliminate the free-floating characteristics of the preferred configuration described.

It will also be noted that true axial alignment between the two ducts 18 and 26 is not absolutely necessary in that a slight angular misalignment therebetween can be accommodated by the flexibility within the diaphragm-like structure 38. Further, as shown in FIG. 3, the dimension of the vibratory stroke D of the vibrating conveyor establishes a relative degree of radial motion between the sealing ring and the surface 36. Thus, the facing surface 36 must be large enough to maintain annular sealing contact between the ring and surface during the extreme amplitudes of vibration. Thus, it is seen that the sealing face 36 has a greater outer diameter and a smaller inner diameter than the seal ring 48 such that all relative movement therebetween maintains the seal ring in annular facing engagement with the surface 36.

The seal assembly of the present invention, which comprises the sealing flange 34 mounted on the extension 30 in sealing engagement with the ring 48 on the diaphragm structure 38, spans the axial distance between the inlet duct 18 and the outlet duct 26 providing a sealed air flow communication. Further, the ability of the extension 30 and the axial extension 44 to permit relative axial positioning on the respective ducts prior to assembly permits this seal to accommodate various axial separations within a relatively wide range for retrofitting seal structure on present equipment. Further, because of the ability of the air seal to effect a sealing engagement by abutment between respective portions on separate air ducts, it is apparent that such seal is useful in applications where sealed interconnections are generally inaccessible for final clamped or other mechanical equipment.

It is thereby seen that an all-metal seal structure is provided which is free-floating in that the sealing interface is a non-confined engagement between the relatively vibrating ducts and in which the internal static pressure of the drying air increases the effectiveness of the seal by biasing the seal ring 48 into the sealing surface 36 to maintain an efficient seal. With such seal, air temperatures on the order of 700° F. have been transmitted through the facing ducts without leakage and without any deleterious effects on the seal.

I claim:

1. A seal assembly for substantially sealed air flow communication between a first duct having a vibrational motion generally transverse to the direction of flow and a second generally stationary duct, said seal assembly comprising:

a collar member attached to and encircling said first duct adjacent the outlet thereof and providing an annular sealing surface in a plane generally perpendicular to air flow therethrough, said sealing surface having a radial dimension greater than the amplitude of vibration; and, a diaphragm mechanism attached to and encircling the inlet to said second duct and defining a pair of annular outwardly converging side members connected at their outer periphery with one of said side members sealingly attached to said second duct and the other of said members supporting an annular sealing ring terminating in a place substantially parallel to the plane of said annular surface and extending axially into an abutting sealing engaging relationship with said annular surface, and in axial alignment therewith such that during relative vibrational movement therebetween, full annular engagement is maintained, whereby internal air pressure within said diaphragm mechanism provides a biasing force for maintaining said sealing engagement.

2. The seal assembly of claim 1 wherein said sealing surface, said diaphragm mechanism and said sealing ring are formed of metal.

3. The seal assembly of claim 2 wherein said sealing surface is formed from a metal generally more abrasive resistant than the metal of said seal ring whereby rubbing therebetween tends to wear said ring more than said sealing surface.

4. The seal assembly of claim 2 wherein one of said side members is substantially planar.

* * * * *